United States Patent [19]

McDonald et al.

[11] 4,370,693
[45] Jan. 25, 1983

[54] DEMAGNETIZING APPARATUS FOR A WORKPIECE HOLDING ELECTROMAGNET

[76] Inventors: Donald C. McDonald; Roger B. Ela; Dominic F. Pignataro, all of c/o Walker Magnetics Group, Inc., Rockdale St., Worcester, Mass. 01606

[21] Appl. No.: 221,990

[22] Filed: Jan. 2, 1981

Related U.S. Application Data

[63] Continuation-in-part of Ser. No. 67,366, Aug. 17, 1979.

[51] Int. Cl.³ .............................................. H01F 13/00
[52] U.S. Cl. ...................................... 361/145; 361/149
[58] Field of Search ................................. 361/149, 145

[56] References Cited

U.S. PATENT DOCUMENTS

| | | | |
|---|---|---|---|
| 3,579,053 | 5/1971 | Littwin | 361/145 |
| 3,619,729 | 11/1971 | Littwin | 361/145 |
| 3,626,255 | 12/1971 | Littwin | 361/145 |
| 3,895,270 | 7/1975 | Maddox | 361/145 |
| 4,013,932 | 3/1977 | Aggarwal | 361/145 X |

FOREIGN PATENT DOCUMENTS

| | | | |
|---|---|---|---|
| 2049243 | 4/1972 | Fed. Rep. of Germany | 361/145 |
| 609129 | 6/1976 | U.S.S.R. | 361/149 |

OTHER PUBLICATIONS

J. D. Reed, "Degaussing Electromatic Articles by the Phase Control of AC Power," Western Electric Tech. Digest No. 33, Jan. 1974, pp. 45-46.

*Primary Examiner*—G. Z. Rubinson
*Assistant Examiner*—L. C. Schroeder
*Attorney, Agent, or Firm*—Kenway & Jenney

[57] ABSTRACT

In the electromagnet control apparatus described herein, demagnetization of the electromagnet and a workpiece held thereby, following a period of holding, is effected by stepwise adjustment of the phase setting of a power control means such as a triggerable, semiconductor switching device, thereby controlling the average AC voltage applied to a full wave bridge through which the electromagnet is energized. Reversing switch means are interposed between the bridge and the electromagnet for reversing the direction of the energizing current at each successive step.

15 Claims, 4 Drawing Figures

FIG. 3B

DEMAGNETIZING APPARATUS FOR A WORKPIECE HOLDING ELECTROMAGNET

REFERENCE TO RELATED APPLICATION

This application is a continuation-in-part of copending U.S. patent application Ser. No. 67,366, filed Aug. 17, 1979, entitled "Demagnetizing Apparatus For A Workpiece Holding Electromagnet."

BACKGROUND OF THE INVENTION

This invention relates to demagnetizing apparatus for electromagnets and workpieces held thereby and more particularly to such apparatus effecting periodically reversing energizations of decreasing amplitude.

In many environments in which an electromagnet is used for holding a workpiece, it is necessary to provide some means for demagnetizing the electromagnet and a workpiece held thereby before the workpiece can be readily removed from the holding magnet. Otherwise, the residual magnetism left in both the magnet and the workpiece may be sufficient to inhibit easy removal of the workpiece from the magnet. One example of such a situation is where an electromatic chuck is used for holding one or a plurality of workpieces for a grinding operation.

While various automatic demagnetizing systems have been devised and sold previously, such systems have typically been relatively complex and expensive and have encountered certain problems in employing modern triggerable semi-conductor switching devices such as SCR's and triacs.

Among the several objects of the present invention may be noted the provision of apparatus for automatically deenergizing a workpiece-holding electromagnet, the provision of such apparatus which employs triggerable, semi-conductor switching devices, the provision of such apparatus which is highly reliable and which is of relatively simple and inexpensive construction. Other objects and features will be in part apparent and in part pointed out hereinafter.

SUMMARY OF THE INVENTION

Briefly, apparatus constructed in accordance with the present invention generates a sequence of energizations of the magnetizing winding of an electromagnet to effect release, by the electromagnet, of a magnetizable workpiece. Phase sensitive power control means are provided for controlling the level of energization of a bridge rectifier which powers the magnet winding. Sequential switching means are provided including a first portion for stepwise changing the phase setting of the power control means upon successive actuations of the switching means and a second portion for reversing the polarity of magnetization of the magnet winding means upon successive actuations. Further means are then provided for periodically actuating the sequential switching means.

BRIEF DESCRIPTION OF THE DRAWINGS

FIGS. 3A and 3B are a schematic diagram of a further embodiment of the invention employing solid state digital logic.

Corresponding reference characters indicate corresponding parts throughout the several views of the drawing.

DESCRIPTION OF THE PREFERRED EMBODIMENT

Figure 1:
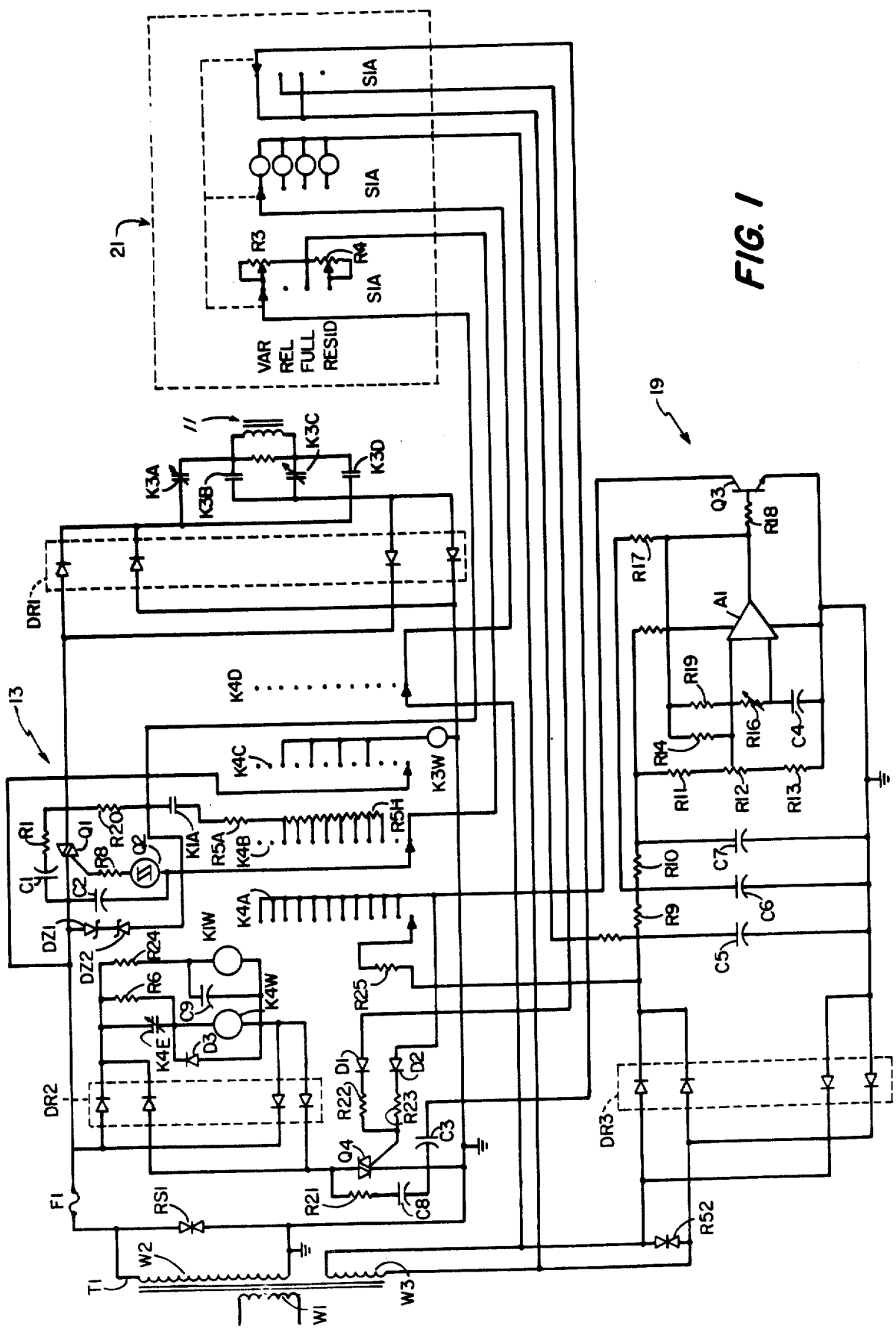
FIG. 1 is a schematic circuit diagram of demagnetizing apparatus constructed in accordance with the present invention.

Referring now to FIG. 1, the control circuitry illustrated there is adapted for controllably energizing an electromagnetic chuck, the energizing winding of which is designated by reference character 11. The controller itself includes a phase sensitive a.c. power control or modulator means, designated generally by reference character 13, a bridge rectifier DR-1 for converting the variable a.c. provided by control circuit 13 to direct current suitable for application to winding 11 and a reversing relay K3 having contacts K3A–K3D connected for controllably reversing the direction in which the direct current is applied to the winding. The controller also includes sequential switching means which, in the embodiment illustrated, comprises a stepping relay designated generally as K4. As explained in greater detail hereinafter, the sequential switching means operates both to progressively change the phase setting of the power control means and to operate relay K3 so as to periodically reverse the polarity of magnetization produced by the chuck winding 11. In the embodiment illustrated, the stepping relay is periodically actuated by means including an astable oscillator or multivibrator, indicated generally by reference character 19. Operator control is exercised over the electromagnetic controller circuitry by means of a remote control assembly, designated generally by reference character 21.

Considering the circuitry in greater detail, a step-up and isolation transformer T1 provides, by means of a secondary winding W2, a supply of voltage capable of, when rectified, fully energizing the electromagnet winding 11. Winding W2 is shunted by a suppressor RS1. The supply voltage obtained from winding W2 is modulated by means of the phase-sensitive modulator circuit 13. The principal phase-sensitive control element in circuit 13 is a triac Q1 which is connected in series between the supply voltage and the full wave bridge DR1. The power terminals of triac Q1 are shunted by a snubber network comprising capacitor C1 and resistor R1. A trigger diode Q2 is connected to the gate or control electrode of triac Q1 through a current limiting resistor R8. Shunting this combination of elements is an energy storage and phase-shifting capacitor C2. As understood by those skilled in the art, a resistance connected between the MT2 terminal of the triac and the trigger diode end of capacitor C2 will cause the triac to be fired at phase angle which depends upon the value of the resistance, this being a relatively simple type of phase angle control. In accordance with one aspect of the present invention, the phase angle controlling resistance is varied in a predetermined stepwise fashion.

To obtain greater insensitivity to line voltage variations, a clipped a.c. signal, synchronized with the anode voltage, is obtained by means of a dropping resistor R20 driving a pair of back-to-back Zener diodes DZ1 and DZ2. This clipped and regulated a.c. voltage is then applied to charge capacitor C2, through a selected value of resistance. Preselected values of resistance are obtained by means of one or more of the series resistors R5A-R5H, the number of resistors in the circuit at any one time being selectable by means of one bank of contacts (K4B) of the stepping relay K4.

The control winding K4W of the stepping relay is selectively energized by means of a triac Q4 which selectively passes a.c. from the winding W2 to a full wave bridge DR2 which supplies the stepping relay coil K4W. In series with the coil K4C is a normally closed contact K4E which is a conventional part of the stepping relay structure and which opens when the stepping relay armature has been pulled home. Opening of this contact places a current limiting resistor R6 in series with the coil K4C in conventional fashion. Coil K4W is also shunted by a kick-back diode D3.

Also selectively energized by the triac Q4 and the diode bridge DR2 is the control winding K1W of a relay having a set of normally open contacts K1A interposed in series with the phase-shifting resistors R5A-R5H. As described in greater detail hereinafter, the relay K1, by means of the contacts K1A, controls the initiation of energization of the magnet winding during each step. Coil K1W is energized through a resistor R24 and is shunted by a capacitor C9, the operation of these two elements being to delay actuation of the relay K1 so that the application of power to the electromagnet through the main triac Q1 is delayed following each operation of the stepping relay. This delay allows arcing at the reversing relay contacts to die out.

Triac Q4 can be turned on by either the astable multivibrator circuit 19 or a manually derived control signal, generated as described hereinafter. These signals are applied to the gate of triac Q4 through respective diodes D1 and D2 and resistors R22 and R23 which, in effect, form an OR gate. A low voltage winding W3 is provided on the transformer T1 for obtaining current to energize the astable multivibrator circuit 19, this winding being shunted by a suppressor RS2. A.c. voltage from winding W3 is rectified by a full wave bridge DR3 and the rectified voltage is applied to the filter network comprising capacitors C5, C6 and C7, resistors R9 and R10. The most heavily filtered voltage, i.e. the voltage on capacitor C7, supplies an integrated circuit op-amp IC1.

A preselected d.c. bias voltage is suppled to the inverting input of amplifier A1 by means of resistors R11, R13 and potentiometer R12. A negative feedback signal derived from the output of the amplifier is mixed into this same input through a resistor R14. Delayed positive feedback is applied to the noninverting input of the amplifier A1 from the amplifier's output terminal through a network comprising resistors R19 and R16 and a delaying capacitor C4. Current is provided to the output terminal through a load resistor R17.

As is understood by those skilled in the art, this combination of in-phase negative feedback and delayed positive feedback around op-amp IC1 produces an astable operation of the amplifier generating, at its output terminal, a square wave signal of preselectable duty cycle. This square wave signal is applied, through a current limiting resistor R18 to the base of an NPN transistor Q3. The collector of transistor Q3 is connected to the gate of triac Q4 through the diode D2 and resistor R23, as described previously. Current to the collector of transistor Q3 is selectively provided through a resistor R25 which is connected to all but one of the sequential contacts of the bank K4A of the stepping relay K4. Thus, the triac K4 will be energized when the transistor Q4 is turned off, unless the stepping relay K4 is in its last or "HOME" position. This is the bottom position as shown in the drawings.

In addition to effecting periodic energization of the stepping relay K4 during demagnetization, the astable multivibrator 19 also controls the energization of the control relay K1 as mentioned previously. Thus, due to the operation of the contacts K1A, the actual period of magnet energization for each step is controllable as a function of the duty cycle of the multivibrator. When the multivibrator first energizes the triac Q4 on each step, the stepping relay is advanced and, after a delay, due to the capacitor C9 shunting the winding K1W, the contacts K1A close causing the magnet winding to be energized at the appropriate level through the triac Q1. On the alternate positions of the cycle of the multivibrator 19, however, the opening of the contacts K1A cause the triac to cease conduction. This controllable interval allows coil current in the magnet and eddy currents in the magnet and workpiece to die down before attempting to reverse polarity and begin the next step in the demagnetization sequence.

The third set or bank of sequential contacts on the stepping relay K4 is connected for selectively energizing the control winding K3W of the reversing relay K3. As may be seen from the drawing, the stepping relay has 12 sequential positions and the contacts K4C are connected so that the winding K3W is energized in the 3rd, 5th, 7th and 9th position of the contacts. It can thus be seen that, on those stepping relay positions, the variable direct current, obtained by means of the controller 13 and the full wave bridge DR1 will be reversed before being applied to the electromagnet winding 11. As will also be appreciated by those skilled in the art, the successively increasing resistances switched into the gate control circuit of the triac Q1, upon successive operations of the stepping relay K4, will cause the resultant direct current level to be sequentially reduced on successive operations of the stepping relay.

The remote control assembly 21 comprises a four position switch S1 having three sets of contacts, S1A, S1B and S1C. The first set of contacts S1A provide a possible circuit for applying the clipped, regulated supply voltage available at the diodes DZ1 and DZ2 directly to the trigger circuit of the triac Q1, i.e. to the trigger diode Q2. The contacts S1A permit that circuit to be either closed, open, or to be constituted by one or the other of two variable resistances, R3 or R4. The second set of contacts S1B effects the energization of a respective control indicator lamp I1-I4 for the purpose of indicating the current position of the switch. The third set of contacts S1C provide for either selectively charging the initiating capacitor C3 or discharging that capacitor into the gate circuit of triac Q4 through the diode D1.

Assuming the remote control switch S1 is in the RELEASE position as shown in FIG. 1 and that the stepping relay K4 is in its bottom or "HOME" position, also as illustrated, the possible sequence of operations of the control and the holding magnet may be understood as follows. If the switch S1 is moved to the FULL position, the contacts S1A cause the full clipped synchronous voltage to be applied to the gate circuit of triac Q1. Accordingly, maximum a.c. power is transmitted from the winding W2, through the full wave bridge DR1, to the electromagnet chuck winding 11, the relay K3 being de-energized so that the current is applied in a first or forward direction.

From the FULL position, the switch can, if desired, be moved to the bottom or RESIDUAL position. In this position, the only difference is that the resistance value selected by R4 is placed into the phase-shifting trigger circuit for the triac Q1. Thus, the power applied to the electromagnet is correspondingly reduced. This quite reduced power level may be selected to permit removal of one of a collection of workpieces when a multiplicity of workpieces are being machined or ground down at one time. In other words, the holding power of the electromagnet is reduced but it is not demagnetized.

From the RESIDUAL setting the control switch S1 can be moved back to FULL to permit continued operation.

In some cases, it may be desirable to firmly hold a smaller workpiece without exerting full holding power, e.g. where such power might distort the workpiece. A setting designated VAR (variable) is provided for this purpose. Again this provides a preselected level of magnetization, the level typically selected to be less than FULL but substantially greater than the so-called RESIDUAL setting.

If it is desired to completely release the workpiece or workpieces, the control switch S1 may be moved to the RELEASE position to effect automatic demagnetization of the electromagnetic chuck and any permeable workpiece held thereby. Initially moving switch S1 to the RELEASE position will cause the contacts S1C to discharge the previously charged capacitor C3 into the gate circuit of the triac Q4 which will, in turn, energize the stepping relay coil K4W. This first energization will cause the stepping relay contacts K4A-K4D to move to the next position in the sequence, this being the top position as illustrated in the drawing. Movement of the first set of contacts K4A away from the bottom or "HOME" position causes current to be available to the collector of Q3 so that the astable multivibrator circuit 19 gains control of the stepping relay through the triac Q4. This means stepping relay will be sequentially stepped through its entire cycle until it again reaches the bottom or home position. Thus, at this point, an automatic sequence of operations is initiated which serves to apply successively reduced currents in sequentially reversing direction to the electromagnet energizing coil 11, thereby to effect demagnetization.

During the first two steps, no further current is applied to the winding. This period allows the inductively stored energy to dissipate insofar as possible. The provision of two full steps is desired since the manual operation of the control switch S1 will typically not be synchronized with the operation of the multivibrator and thus only one of the steps may utilize a full cycle of the multivibrator. Upon reaching the third step from the top, as depicted in the drawing, the relay winding K3W is energized, thereby reversing the polarity of energization of the winding K11 through the contacts K3A-K3D. Despite the delay provided by the first two steps which do not provide any energization, there will typically be some arcing at the contacts of relay K3. The deliberate delay in the operation of relay K1 allows this arcing to die out before reapplying power.

After a delay owing to the time necessary to obtain energization of the winding K1W, the contacts K1A close and an alternating current of reduced amplitude will be transmitted through the triac Q1 to the full wave bridge DR1, resulting in a correspondingly reduced direct current being applied to the winding 11. The particular level of energization is, of course, determined by the value of the resistor R5A which controls the conduction angle of triac Q1. The period of energization is determined by the duty cycle of the multivibrator as described previously, the magnet being energized during one portion of the cycle and being de-energized during alternated portions to allow coil currents and eddy currents to die out before reversing connections to the magnet and re-energizing.

When the stepping relay is again energized by the astable multivibrator circuit 19, the relay K3 will be de-energized so that the original forward direction of energization is established for the magnet winding and, again, after a delay, a still further reduced value of alternating current will be applied to the bridge and thence, as direct current, to the magnet winding. As may be deduced from the drawing, this sequence of reversing connections and sequentially reduced levels of energization from the phase-sensitive AC power controller circuit 13 will continue until the stepping relay again reaches its "HOME" position at which point no further current will be applied to the winding 11. Assuming that the resistances R5A through R5H are appropriately chosen, almost complete elimination of residual magnetism from the electromagnetic chuck and its workpiece can be achieved in this manner so that even relatively large workpieces can be removed from the chuck.

While the end result of the apparatus disclosed is to produce successively decreasing and alternately reversing direct current energizations of the magnet winding 11, a function of which has, in general, been effected by prior art controllers, it should be noted that the modulation or variation in power level is obtained by varying the average a.c. voltage of an alternating current applied to the input side of the full-wave bridge. This variation is obtained by using a triggerable semiconductor switching device whereas, with inductive loads, such devices are normally employed only to duty cycle modulate pulsatile direct current, e.g. on the output side of a rectifier.

In addition to its role in converting the variable level alternating current to direct current suitable for energizing a magnet winding, the full-wave bridge DR1 serves the additional function of isolating the triggerable semiconductor current switching device Q1 from the effects of the inductive nature of the winding 11 and allowing the switching device to commutate despite this high value of inductance.

The phase angle of triggering of the switching device Q1 is controlled in stepwise fashion by the contacts K4B and resistors R5A-R5H as described above. By employing this stepwise adjustment of the phase angle, the level of magnetization can be precisely preselected for each step in the demagnetizing sequence. As will be understood by those skilled in the magnetics art, it becomes highly critical to precisely control the level of energization as the B/H hysteresis loops approach the origin of the magnetization plot in order to obtain minimum residual magnetism. The construction of the present invention allows this since the values of the resistors can be individually selected to obtain the desired level and can take into consideration the characteristics of the particular magnet with which the controller is to be used.

Figure 2:
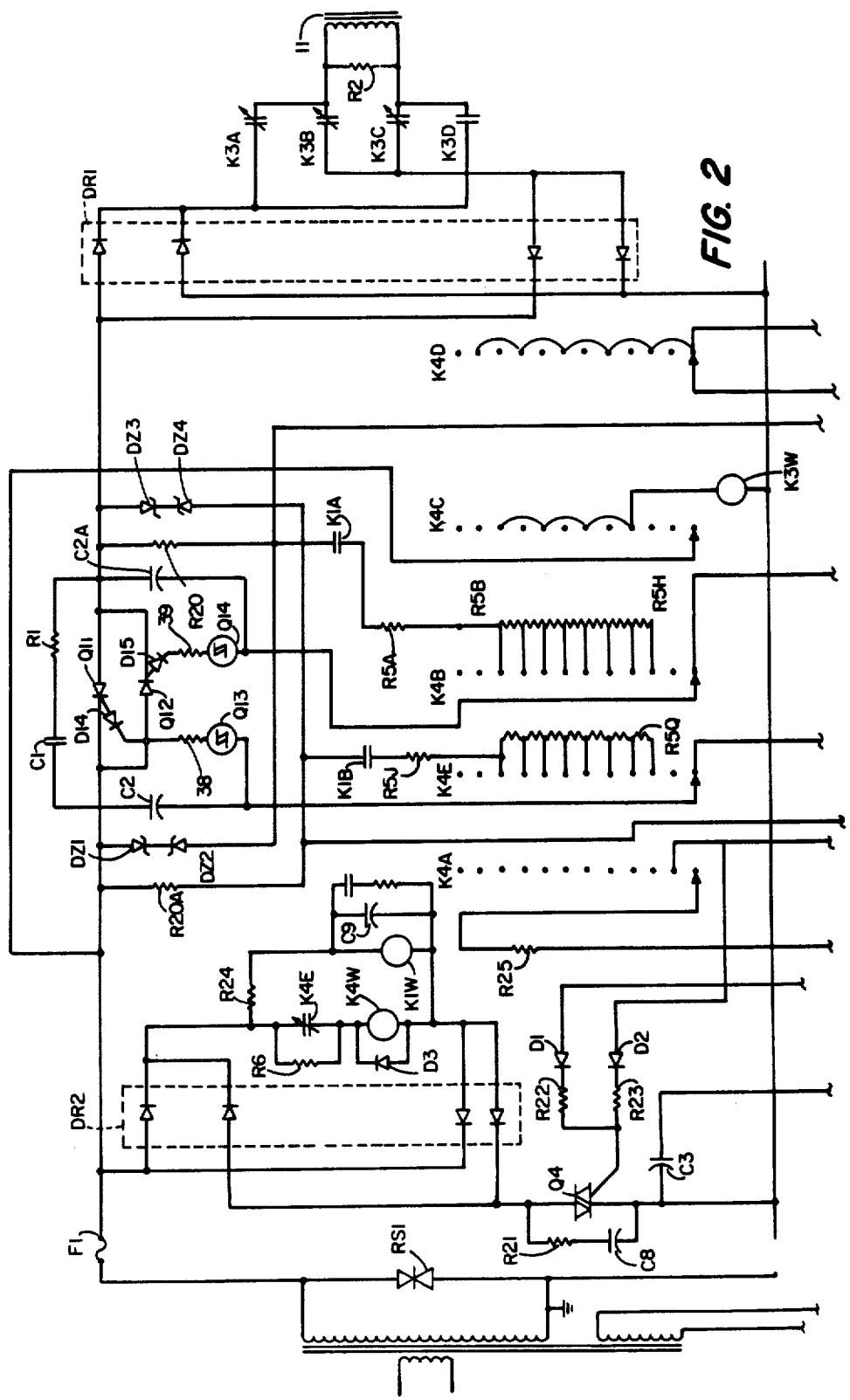
FIG. 2 is a schematic circuit diagram of an alternative embodiment of the invention.

While the controller illustrated in FIG. 1 is adapted for use with a Triac type of triggerable semiconductor current switching device, the principles of the present invention can be similarly applied where it is desired to use a pair of SCR's connected in parallel but oppositely poled for handling a greater power than is possible with triacs of reasonable cost. The power controller portion of an embodiment constructed in accordance with this modification is illustrated in FIG. 2. In place of the single triac, the FIG. 2 embodiment employs a pair of SCR's Q11 and Q12 provided with respective trigger diodes or diacs Q13 and Q14. In addition to the current-limiting resistors 38 and 39 which are comparable to the current-limiting resistor R8 used with the triac, each SCR gate circuit is provided with a respective diode D14 and D15 allowing the respective gate electrode to be isolated during alternate a.c. half cycles.

Since the SCR's will be triggered on alternate half cycles, separate phase shifting and triggering circuits are provided. In this regard, the back-to-back Zener diodes DZ1 and DZ2 are replicated as DZ3 and DZ4. There is likewise a companion series resistor R20A. Similarly, the stepping relay is provided with a fifth bank of sequential contacts, designated K4E. This additional bank of contacts selectively switches into the trigger circuit successive ones of a corresponding set of resistors, R5J through R5Q. It can thus be seen that each SCR is provided with a respective phase-shifting and triggering network which parallels its mate. Accordingly, for each stage in the sequential process of de-energizing an electromagnet and workpiece, the conduction angles of the two SCR's can be matched so that a balanced alternating current is provided. Likewise, on successive steps in the sequence, the power levels can be precisely adjusted in the same manner as with the previous embodiment of FIG. 1.

As is understood by those skilled in the art, the reliable commutation of back-to-back SCR's in a variable a.c. supply circuit is even more critical than the situation which exists with a triac. Thus, the presence of the bridge DR1 between the SCR's and the winding is highly significant in allowing reliable commutation despite the highly inductive nature of the load which the controller must drive.

Figure 3A:
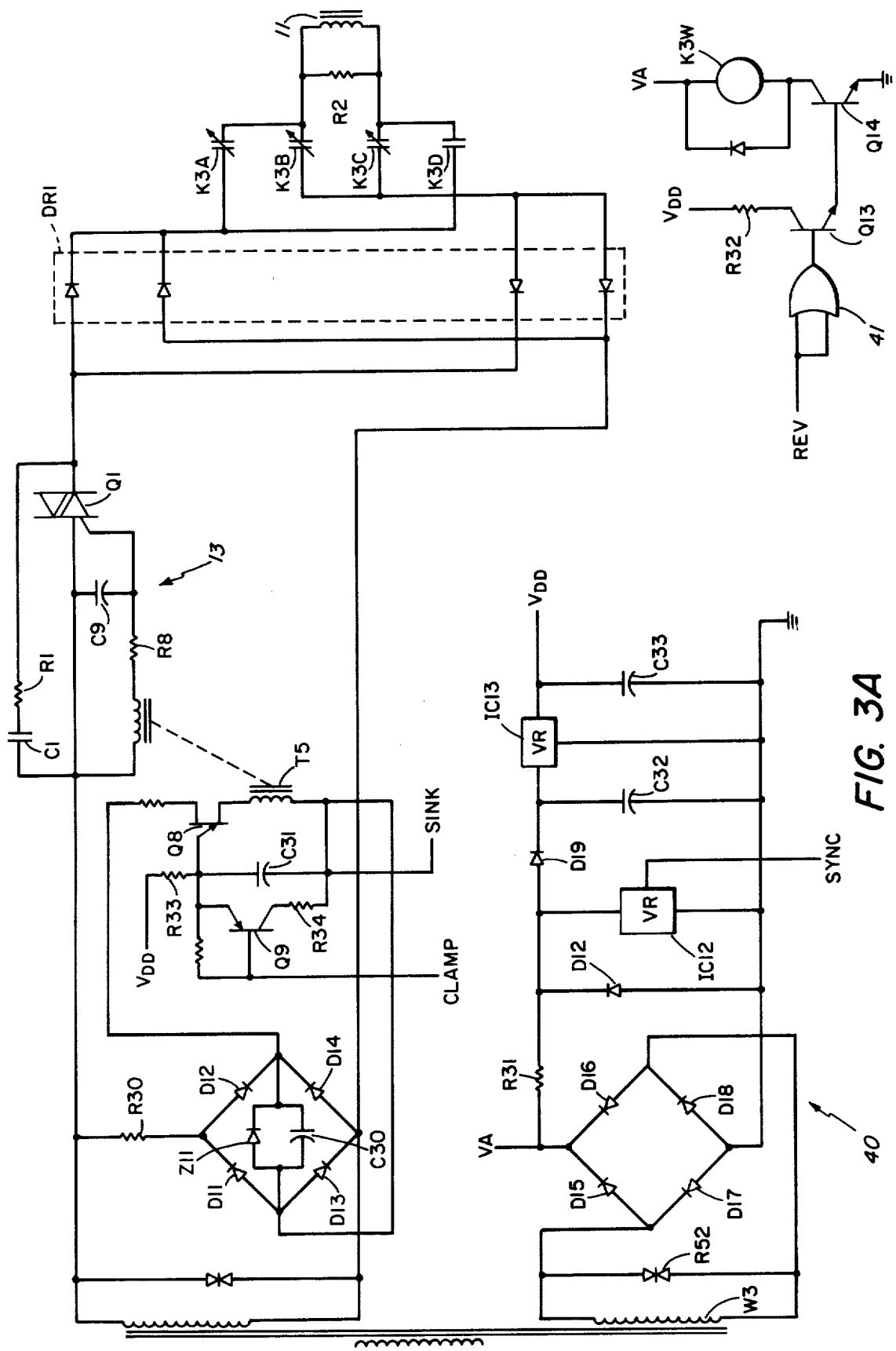
Figure 3B:
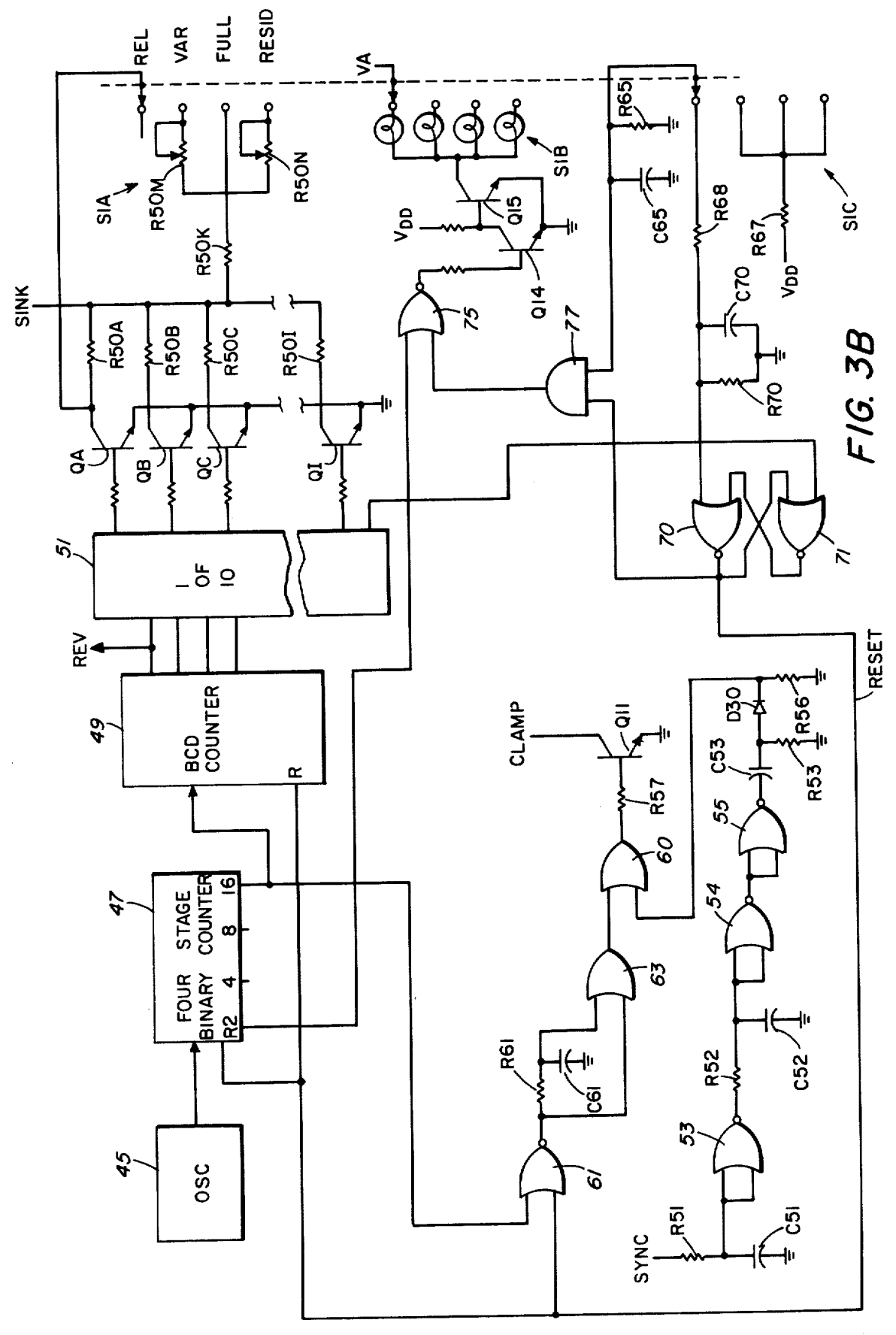

The present invention may also be implemented using integrated circuit logic devices in place of the stepping relay employed in the embodiments of FIGS. 1 and 2. An embodiment employing solid state counters and decoders in place of the stepping relay is illustrated in FIGS. 3A and 3B. FIG. 3A comprises most of the powering-handling components, which are largely like those used in the previous embodiments, and FIG. 3B comprises mainly the logic or control circuitry.

Referring now to FIG. 3A, the a.c. power control or modulator means 13 again employs a triac Q1 in a phase-sensitive power modulating circuit, as in the embodiment of FIG. 1. Likewise, the modulated a.c. power is rectified by a bridge DR1 and is applied to the magnet winding 11 through the contacts K3A-K3D on the reversing relay K3. Rather than the trigger diode of FIG. 1, however, the triac Q1 in the FIG. 3A power-modulating circuit is selectively triggered by a unijunction transistor Q8 whose pulsatile output signal is applied to the gate of the triac through a transformer T5. The primary of the transformer is in series with the channel circuit of the unijunction transistor while the secondary is connected to the gate of the triac Q1, as illustrated. The operation of unijunction transistor Q8 is synchronized with the triac Q1 by energizing the unijunction with a full wave rectified version of the a.c. voltage applied across the triac circuit. Rectification is provided by a bridge comprising diodes D11-D14 while clipping is provided by a Zener diode Z11 shunting the output circuit of the bridge, a series voltage drop being provided by a resistor R30. Transient suppression is provided by a capacitor C30 connected across the Zener diode.

The input circuit to the unijunction transistor Q8 is shunted by a timing capacitor C31. As will be understood by those skilled in the art, the time, within each a.c. half cycle, at which triggering of the triac will occur depends upon the rate at which capacitor C31 is charged. During demagnetization, this rate of charging is periodically adjusted in a stepwise fashion by the digital logic circuitry of FIG. 3B, as described in greater detail hereinafter. At the outset, however, it may be noted that this control circuitry is in effect "floated" in potential so that it can control the charging current of capacitor C31 even though the unijunction circuit with which capacitor C31 is associated is directly connected to an a.c. supply line. An isolated power supply circuit for energizing the control circuitry, allowing its nominal ground to float, is indicated generally by reference character 40. Isolation is provided by a secondary winding W3. A suppressor RS2 is connected across this winding. A full wave bridge, comprising diodes D15-D18, provides full wave rectified a.c. The operating coil K3W of the reversing relay K3 is operated from this unfiltered supply, under control of the logic circuitry. The logic signal controlling the reversing relay K3 is designated REV and is applied, through a buffering gate 41, to a pair of Darlington-connected transistors Q13 and Q14 which control the coil K3W.

The full wave output from the bridge (D15-D18) is clipped by means of a Zener diode Z12, voltage dropping being provided by a resistor R31. A further clipped version of this full wave rectified signal is provided as a SYNC signal by means of an integrated circuit voltate regulator IC12. The regulator provides a precise maximum value of the waveform while maintaining synchronization with the a.c. supply. This signal is employed for various synchronization purposes as described hereinafter. The clipped voltage obtained from the Zener diode Z12 is applied, through a diode D19, to a filter capacitor C32. This voltage is regulated by an integrated circuit voltage regulator IC13 to provide a voltage, e.g. twelve volts, suitable for energizing integrated circuit logic, additional filtering being provided by capacitor C33. This regulated supply voltage is designated VDD in conventional fashion. Referring back to FIG. 3A, the positive side of the current source which charges the unijunction timing capacitor C31 is provided from this regulated voltage source, through a fixed resistor R33. The actual charging rate of the timing capacitor C31 is, however, controlled on the negative side. This variable current signal, obtained from the control circuitry of FIG. 3B, is designated SINK, i.e. for current sink. As is described in greater detail hereinafter, the charging rate is selectively controlled by the FIG. 3B circuitry to effect the level of energization desired in each mode of operation and in the successive states of demagnetization.

Timing capacitor C31 can be selectively discharged or reset by means of a switching transistor Q9 which shunts the capacitor, current limiting being provided by a resistor R34. This signal which controls this transistor is designated CLAMP and is likewise obtained from the control circuitry of FIG. 3B.

In previous embodiments, the stepwise operation was controlled or timed by an astable multivibrator whose frequency of operation corresponded essentially directly with the frequency of stepping. In contrast, the control circuitry illustrated in FIG. 3B employs an oscillator operating at a substantially higher frequency. This oscillator is indicated by reference character 45. Oscillator 45 drives a four-stage, i.e. divide-by-sixteen, counter 47. The output from the last stage of binary counter 47 is applied to advance a BCD (binary coded decimal) counter 49. BCD counter 49 is the device which actually defines the successive states in the progressive demagnetization performed in accordance with the present invention. For the purpose of obtaining successive, discretely defined states, the BCD coded output signals from the counter 49 are applied to a one-of-ten decoder 51. Each of the first nine of the output signals from decoder 51 controls, through a respective current limiting resistor, a respective switching transistor QA-QI. The collectors of switching transistors QA-QI are connected to the SINK lead through respective current controlling resistors R50A-R50I.

The operation of the decoder 51 is such that only one of the switching transistors QA-QI is turned on at any one time and thus the current drawn through the SINK line can be uniquely determined by adjusting the value of the respective resistor R50A-R50I. As indicated previously, the current drawn through the SINK line determines the phase at which the unijunction transistor Q8 triggers the triac Q1 so as to control the power provided to the magnet in a manner analogous to the resistors R5A-R5H in the embodiments of FIGS. 1 and 2.

The SYNC signal obtained from the isolated power supply 40 is delayed by an R/C network comprising resistor R51 and capacitor C51 and, after buffering by a NOR gate 53, is further delayed by an R/C network comprising resistor R52 and capacitor C52. After further buffering by a pair of NOR gates 54 and 55, which effect a "squaring up" of this signal, a differentiation is performed by a capacitor-resistor network comprising capacitor C53 and resistor R53. The positive-going portion of the resultant spike signal is selected by means of a diode D30, ground reference being maintained by a resistor R56. This positive-going spike is applied as one input to an OR gate which selectively energizes, through a resistor R57, switching transistor Q11 which provides the CLAMP signal. By appropriately adjusting the delays effected by the various R/C networks, this positive-going pulse signal is caused to appropriately coincide in time with the zero crossings of the a.c. supply voltage and thereby effect synchronization of the operation of the unijunction triggering circuit with the a.c. supply.

The clamping circuit also operates to inhibit operation of the unijunction triggering circuit at the start of each period of energization, i.e. in a manner similar to that provided by the relay K1 in the embodiments of FIGS. 1 and 2. The output signal from the last stage of binary counter 47 is applied as one input to a NOR gate 61. The output signal from gate 61 is applied directly as one input to an OR gate 63 and, through a delay network comprising resistor R61 and capacitor C61, as the other input to that same gate. The output signal from OR gate 63 is applied as the second input to OR gate 60 and can thus also energize the clamp transistor Q9. The undelayed signal provided to gate 63 assures that the triggering circuit will be turned off promptly at the end of each step of de-energization while the delay introduced by resistor R61 and capacitor C61 delays the re-energization of the triggering circuit and likewise delays the reapplication of power to the magnet until any arcing at the contacts of the reversing relay has died out.

The embodiment illustrated in FIGS. 3A and B employs essentially the same control switch arrangement as the previous embodiments, i.e. a manually operable control switch of three switching sections, S1A-S1C, each having four positions so as to provide for full energization, variable energization, residual energization, and release, just as in the previous embodiments. Switching section S1A effects the current drawn through the SINK line and thus controls the level of energization as in the previous embodiment. At the full setting, a resistor R50K having a relatively low value of resistance is switched on to the SINK line whereas in the variable and residual settings, additional adjustable resistances R50N and R50M are added in to control the power level appropriately, i.e. as was explained with respect to the previous embodiments.

The movable contact in the third switch section S1C carries a capacitor C65 which is employed for triggering a sequence of release operations. Capacitor C65 is shunted by a resistor R65. In all positions except the release position, the capacitor is charged through a resistor R67. When the switch is initially moved from any other position into the release position, a pulse is applied through a resistor R68, to trigger or set a flip-flop comprising a pair of NOR gates 70 and 71. This input signal to the flip-flop is filtered by a filter comprising capacitor C70 and resistor R70.

The output signal from the flip-flop is the control circuitry RESET signal. This RESET signal is supplied to the reset terminals of the binary counter 47 and the BCD counter 49. This signal is normally applied and inhibits the operation of these counters when the manual control switch is in any position except release. When the switch is moved to the release position, the flip-flop is set so as to withdraw the RESET signal, allowing the counters 47 and 49 to advance, and generate the demagnetizing sequence.

The second section S1B of the control switch controls the indicator lamps which signal the mode of operation. Current is applied to a selected one of the lamps through the movable contact, as indicated, and the other sides of the lamps are selectively grounded through cascaded current-switching transistor Q14 and Q15. The switching transistors are controlled through a NOR gate 75. One input to the NOR gate 75 is obtained from an AND gate 77 which combines the signal obtained from the movable contact of switch section S1C with the RESET signal. Thus, if the reset signal is present and the movable contact of sections S1C is in any position other than the release position, the selected lamp can be steadily energized. When the control switch is in the release position, however, the top lamp can be energized only through the other input to the NOR gate 75 and this is taken from the first stage of the binary counter 47. Accordingly, while the device is actually proceeding through the demagnetizing sequence, the lamp for the release position will blink, indicating the fact that demagnetization is in progress. Accordingly, the operator will be informed that the release procedure is still ongoing and will not attempt to move the control switch before the sequence is complete. At the end of the sequence, since the counters are reset, the indicator lamp will be extinguished and the operator will thus be made aware that the sequence is complete.

As indicated previously, the embodiment of FIGS. 3A and 3B provides, from the point of view of demagnetizing the electromagnet in any workpiece, the same mode of operation as the embodiments of FIGS. 1 and 2. Summarizing the manner in which this is implemented, it will be understood that full power or either of two intermediate values of magnetization may be provided on a steady or continuous basis by manually operating the control switch S1A-S1C to connect an appropriate value of resistance to the SINK lead. When the switch, however, is then moved to the release position, the voltage previously stored in capacitor C65 sets the flip-flop comprising the gates 70 and 71 thereby withdrawing the RESET signal. At this point, the counters 47 and 49 are released and begin counting. As each of the transistors QA-AI is turned on in sequence, the corresponding current determining resistor R50A-R50I is connected to the SINK lead and the appropriate value of current is applied, through the phase-sensitive modulating circuit, to the magnet winding 11.

The least significant bit from the BCD counter 49 is applied as the REV signal which controls the reversing relay K3 so that the direction of magnetization on each successive step is reversed from its predecessor. Power is not immediately applied to the magnet at the start of each step since the delay introduced by network comprising resistor R61 and capacitor C61 causes the CLAMP signal to be applied for a brief period at the start of each step, thereby inhibiting the unijunction trigger circuit for a period sufficient to extinguish arcing at the contacts of the reversing relay K3.

The output signal from the last stage of the decoder 51 is applied to reset the flip-flop comprising gates 70 and 71, thereby restoring the RESET signal and re-establishing the initial condition. The demagnetization sequence will only be subsequently restarted if the control switch is moved away from the release position, allowing the capacitor C65 to be recharged, and then moved back to the release position so as to again trigger the release sequence of operations.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

We claim:

1. Apparatus for generating a sequence of energizations of the winding of an electromagnet to effect release, by the electromagnet, of a magnetizable workpiece, said apparatus comprising:

phase sensitive power control means providing alternating current of variable average voltage from an a.c. supply voltage of fixed amplitude;

a full wave rectifier means interconnected with said power control means for proving variable direct current from said variable alternating current;

a current reversing switch circuit for connecting the d.c. output of said rectifier means to said electromagnet in either a forward or a reverse direction;

sequential switching means including a first portion for progressively changing the phase setting of said power control means upon successive actuations and a second portion for reversing the polarity of magnetization of said magnet winding by said switch circuit upon successive actuations of said switching means; and means for periodically actuating said sequential switching means.

2. Apparatus as set forth in claim 1 wherein said phase sensitive power control means comprises at least one triggerable semiconductor current switching device.

3. Apparatus as set forth in claim 1 wherein said power control means comprises a triac.

4. Apparatus as set forth in claim 1 wherein said phase sensitive power control means comprises a pair of SCRs connected in parallel but oppositely poled.

5. Apparatus as set forth in claim 1 wherein said switching means is a stepping relay.

6. Apparatus as set forth in claim 5 wherein said first portion of said sequential switching means includes a first set of contacts on said stepping relay connected for progressively varying a resistance which determines the phase setting of said phase sensitive power control means.

7. Apparatus as set forth in claim 5 including a reversing relay for selectively reversing the polarity of magnetization of said magnet winding and wherein the second portion of said sequential switching means comprise a second set of contacts on said stepping relay, selected ones of the contacts on said second set being connected for energizing said reversing relay.

8. Apparatus for generating a sequence of energizations of the winding of an electromagnet to effect release, by the electromagnet, of a magnetizable workpiece, said apparatus comprising:

phase sensitive power control means providing alternating current of variable average voltage from an a.c. supply voltage of fixed amplitude;

a full wave bridge rectifier interconnected with said power control means for proving variable direct current from said variable alternating current;

a reversing relay having contacts for connecting the d.c. output of said bridge to said electromagnet in either a forward or a reverse direction;

sequential switching means including a first portion for progressively changing the phase setting of said power control means upon successive actuations and a second portion for selectively energizing said reversing relay for reversing the polarity of magnetization of said magnet winding by said power control means upon successive actuations of said switching means; and means for periodically actuating said sequential switching means.

9. Apparatus as set forth in claim 8 including also means for selectively enabling the phase sensitive power control means, said periodic actuating means being interconnected with said enabling means for permitting conduction through said power control means only during selected portions of the periodic cycle of said sequential switching means.

10. Apparatus for generating a sequence of energizations of the winding of an electromagnet to effect release, by the electromagnet, of a magnetizable workpiece, said apparatus comprising:

a triggerable semiconductor current switching device providing alternating current of variable average voltage from an a.c. supply voltage of fixed amplitude;
a phase shifting network including a plurality of resistances for controlling the phase angle of triggering of said device;
a full wave bridge rectifier interconnected with said power control means for proving variable direct current from said variable alternating current;
a reversing relay having contacts for connecting the d.c. output of said bridge to said electromagnet in either a forward or a reverse direction;
sequential switching means including a first portion for progressively switching in different ones of said resistances for changing the phase setting of said power control means upon successive actuations, said sequential switching means including also a second portion for selectively energizing said reversing relay for reversing the polarity of magnetization of said magnet winding by said power control means upon successive actuations of said switching means; and
means for periodically actuating said sequential switching means.

11. Apparatus as set forth in claim 10 including also means for selectively enabling the triggerable semiconductor current switching device, said periodic actuating means being interconnected with said enabling means for permitting conduction through said current switching devices only during selected portions of the periodic cycle of said sequential switching means.

12. Apparatus for generating a sequence of energizations of the winding of an electromagnet to effect release, by the electromagnet, of a magnetizable workpiece, said apparatus comprising:
externally controlled selection means having a first "hold" state and a second "release" state;
phase sensitive power modulating means for controlling the level of energization of said magnet winding;
sequential switching means controlling said power modulating means and having a "home" state in which said power control means can fully energize said magnet winding, said switching means including also a first contact portion for progressively changing the phase setting of said power control means upon successive actuations and a second contact portion for reversing the polarity of magnetization of said magnet winding by said power control means upon successive actuations of said switching means;
selectively operable means for periodically actuating said sequential switching means; and
means for driving said switching means from said "home" state when said selection means is initially moved from said "hold" state to said "release" state and for energizing said periodic actuating means in said "release" state until said "home" state is again reached.

13. Apparatus for generating a sequence of energizations of the winding of an electromagnet to effect release, by the electromagnet, of a magnetizable workpiece, said apparatus comprising:
externally controlled selection means having a first "hold" state and a second "release" state;
phase sensitive power modulating means for controlling the level of energization of said magnet winding;
a reversing relay which, when energized, applies current from said power modulating means to said magnet winding in a first direction and, when de-energized, applies current from said power control means to said magnet winding in a reverse direction;
a stepping relay including a first set of contacts which, on alternating states in the sequence of operation of said stepping relay, energize and de-energize said reversing relay, said stepping relay including also a second set of contacts which, on sequential states of said stepping relay, progressively changes the phase setting of said power control means, said stepping relay including also an actuating winding for advancing said first and second contacts, said stepping relay having a "home" position in which said power modulating means can fully energize said magnet winding;
selectively operable means for periodically energizing said stepping relay; and
means for driving said stepping switch from said "home" state when said selection means is initially moved from said "hold" state to said "release" state and for energizing said periodic energizing means in said "release" state until said "home" state is again reached.

14. Apparatus for generating a sequence of energizations of the winding of an electromagnet to effect release, by the electromagnet, of a magnetizable workpiece, said apparatus comprising:
externally controlled selection means having a first "hold" state and a second, "release" state;
a triggerable semiconductor current switching means for controlling the level of energization of said magnet winding;
a phase shifting network including a plurality of resistances for controlling the phase angle of triggering of said device;
a full wave bridge rectifier for converting variable amplitude a.c. obtained from said device to variable amplitude d.c.;
a reversing relay which, when energized, applies direct current from said bridge to said magnet winding in a first direction and, when de-energized, applies direct current from said bridge to said magnet winding in a reverse direction;
a stepping relay including a first set of contacts which, on alternating states in the sequence of operation of said stepping relay, energize and de-energize said reversing relay, said stepping relay including also a second set of contacts which, on sequential states of said stepping relay, progressively switch in different value of said resistances to change the phase setting of said power control means, said stepping relay including also an actuating winding for advancing said first and second contacts, said stepping relay having a "home" position in which said power modulating means can fully energize said magnet winding;
selectively operable means for periodically energizing said stepping relay; and
means for driving said stepping switch from said "home" state when said selection means is initially moved from said "hold" state to said "release" state and for energizing said periodic energizing means in said "release" state until said "home" state is again reached.

15. Apparatus as set forth in claim 14 including also means for selectively enabling the triggerable semiconductor current switching means, said periodic actuating means being interconnected with said enabling means for permitting conduction through said current switching means for portions only of the periodic cycle of said stepping relay.

* * * * *